US012675395B2

(12) United States Patent
Sinha et al.

(10) Patent No.: US 12,675,395 B2
(45) Date of Patent: Jul. 7, 2026

(54) SHARED FUNCTION FOR MULTI-PORT MEMORY DEVICE

(71) Applicant: Micron Technology, Inc., Boise, ID (US)

(72) Inventors: Gaurav Sinha, Unterschleißheim (DE); Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/414,355

(22) Filed: Jan. 16, 2024

(65) Prior Publication Data

US 2024/0241823 A1      Jul. 18, 2024

Related U.S. Application Data

(60) Provisional application No. 63/480,209, filed on Jan. 17, 2023.

(51) Int. Cl.
G06F 12/02          (2006.01)
(52) U.S. Cl.
CPC ............................... G06F 12/0246 (2013.01)
(58) Field of Classification Search
CPC .... G06F 12/0246; G06F 3/061; G06F 3/0631; G06F 9/544; G06F 13/1663; G06F 3/0679
USPC ........................ 711/147, 103, 12.008, 12.039
See application file for complete search history.

(56) References Cited

U.S. PATENT DOCUMENTS

| | | | | |
|---|---|---|---|---|
| 6,421,711 | B1 * | 7/2002 | Blumenau | H04L 61/35 |
| | | | | 710/36 |
| 6,438,595 | B1 * | 8/2002 | Blumenau | H04L 67/1036 |
| | | | | 709/229 |
| 7,912,051 | B1 * | 3/2011 | Rowlands | H04L 45/02 |
| | | | | 709/213 |
| 11,467,776 | B1 * | 10/2022 | Chang | G06F 3/061 |
| 2004/0103261 | A1 * | 5/2004 | Honda | G06F 3/0665 |
| | | | | 711/202 |
| 2013/0031343 | A1 * | 1/2013 | Chou | G06F 9/4406 |
| | | | | 713/2 |
| 2020/0226078 | A1 * | 7/2020 | Tanaka | G06F 12/0806 |
| 2021/0406174 | A1 * | 12/2021 | Gole | G06F 3/0679 |
| 2023/0297252 | A1 * | 9/2023 | Sekine | G06F 3/0634 |
| | | | | 711/154 |
| 2023/0385220 | A1 * | 11/2023 | Li | G06F 13/1663 |
| 2024/0020250 | A1 * | 1/2024 | Choi | G06F 11/0772 |

* cited by examiner

*Primary Examiner* — Jared I Rutz
*Assistant Examiner* — Edward Waddy, Jr.
(74) *Attorney, Agent, or Firm* — Harrity & Harrity, LLP

(57)          ABSTRACT
Implementations described herein relate to a shared function for a multi-port memory device. In some implementations, a memory device may include a first port, a second port, and one or more components configured to manage a shared function of the memory device. The shared function of the memory device may enable a host device that is connected to the first port of the memory device to identify and enumerate the second port of the memory device. In some implementations, the shared function of the memory device may establish a virtual connection between the first port and the second port, and may enable the host device that is connected to the first port of the memory device to share a resource or a function with another host device that is connected to the second port of the memory device.

20 Claims, 6 Drawing Sheets

400

600

610 Identify a first port of a memory device

620 Identify a second port of the memory device

630 Manage a shared function of the memory device, wherein the shared function of the memory device is configured to enable a host device that is connected to the first port of the memory device to identify and enumerate the second port of the memory device

SHARED FUNCTION FOR MULTI-PORT MEMORY DEVICE

CROSS-REFERENCE TO RELATED APPLICATION

This Patent Application claims priority to U.S. Provisional Patent Application No. 63/480,209, filed on Jan. 17, 2023, entitled "SHARED FUNCTION FOR MULTI-PORT MEMORY DEVICE," and assigned to the assignee hereof. The disclosure of the prior Application is considered part of and is incorporated by reference into this Patent Application.

TECHNICAL FIELD

The present disclosure generally relates to memory devices, memory device operations, and, for example, to a shared function for a multi-port memory device.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
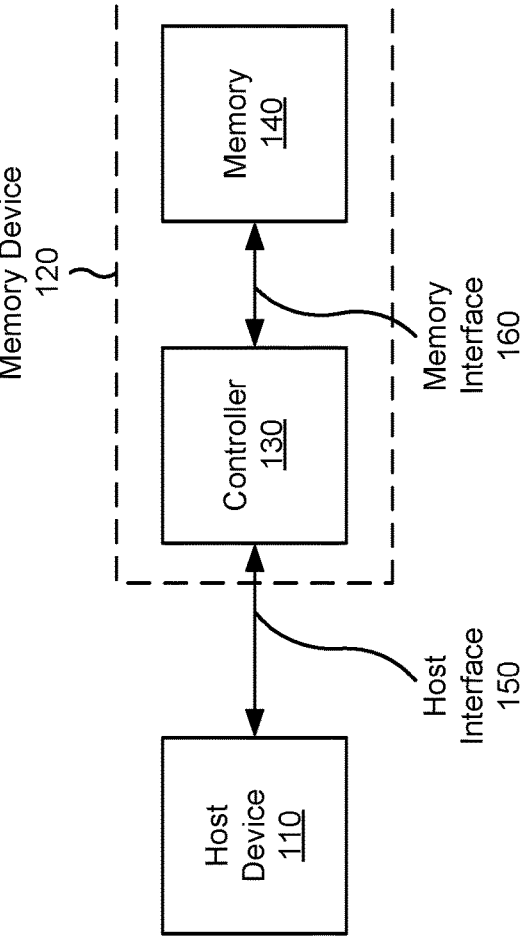
FIG. 1 is a diagram illustrating an example system capable of implementing a shared function for a multi-port memory device.

A centralized storage system may include multiple host devices that are simultaneously connected to a memory device via different ports of the memory device. For example, a centralized storage system associated with an automotive architecture may include a multi-port solid state device (SSD) that allows multiple system-on-chip (SOC) devices or computers to simultaneously connect to the SSD via different ports of the SSD. In this example, various systems in the automotive architecture may need to collaborate and share resources. However, different host devices connected to different ports of the SSD may not be able to communicate or share information with each other. This may prevent the host devices from leveraging on various features that are available to devices that are connected over a peripheral component interconnect express (PCIe) bus interface.

In some cases, a host device may connect to a memory device using an enumeration process. The enumeration process may include, for example, the host device detecting the memory device and determining one or more characteristics of the memory device, such as the type of memory included in the memory device and a speed at which to communicate with the memory device. During PCIe enumeration, each function on each port of the memory device may be assigned a unique address, such as a bus:device:function (B:D:F) address. However, PCIe enumeration does not cross port boundaries. A host device that is connected to a first port of the memory device may not be able to identify or enumerate a second port of the memory device. For example, the host device may not be able to determine an address of the ports to which it is not physically connected, and may not be able to establish communication sessions with other host devices connected to those ports for resource sharing purposes. Thus, the host device may not be able to determine whether the other host devices are in an online state or an offline state, a bandwidth to be allocated for each host device for performing read or write operations, and a command queue depth for performing memory device operations, among other examples. In some cases, the host device may be able to communicate with the one or more other host devices over a separate PCIe bus. However, this may introduce additional system cost and complexities.

Some implementations described herein enable a shared function for a multi-port memory device. The memory device may include at least a first port, a second port, and one or more components that are configured to manage a shared function of the memory device. A first host device may be physically connected to the first port of the memory device, and a second host device may be physically connected to the second port of the memory device. The shared function of the memory device may enable the first host device that is connected to the first port of the memory device to identify and enumerate the second port of the memory device. For example, the shared function may establish a virtual connection between the first port and the second port to enable data sharing between the first port and the second port. In some implementations, the shared function may enable the first host device that is connected to the first port of the memory device to share a resource or a function of the first host device with the second host device that is connected to the second port of the memory device. This may enable the first host device and the second host device to communicate and share information, for example, to determine whether the first host device or the second host device is in an online state or an offline state, to identify a bandwidth to be allocated for performing memory device operations, and to determine a command queue depth, without the need for a separate PCIe connection between the first host device and the second host device. Additional details are described herein.

FIG. 1 is a diagram illustrating an example system 100 capable of implementing a shared function for a multi-port memory device. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, an SSD, a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a PCIe interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, a memory device may include a first port; a second port; and one or more components configured to manage a shared function of the memory device, wherein the shared function of the memory device is configured to enable a host device that is connected to the first port of the memory device to identify and enumerate the second port of the memory device.

In some implementations, a system may include a memory device, wherein the memory device comprises: a first port; a second port; and a configuration register that is configured to manage a shared function of the memory device; and a host device, wherein the host device is configured to: connect to the first port of the memory device; and identify and enumerate the second port of the memory device using the shared function of the memory device, wherein the host device is physically connected to the first port of the memory device but is not physically connected to the second port of the memory device.

In some implementations, an apparatus may include means for identifying a first port of a memory device; means for identifying a second port of the memory device; and means for managing a shared function of the memory device, wherein the shared function of the memory device is configured to enable a host device that is connected to the first port of the memory device to identify and enumerate the second port of the memory device.

As indicated above, FIG. 1 is provided as an example. Other examples may differ from what is described with regard to FIG. 1.

Figure 2:
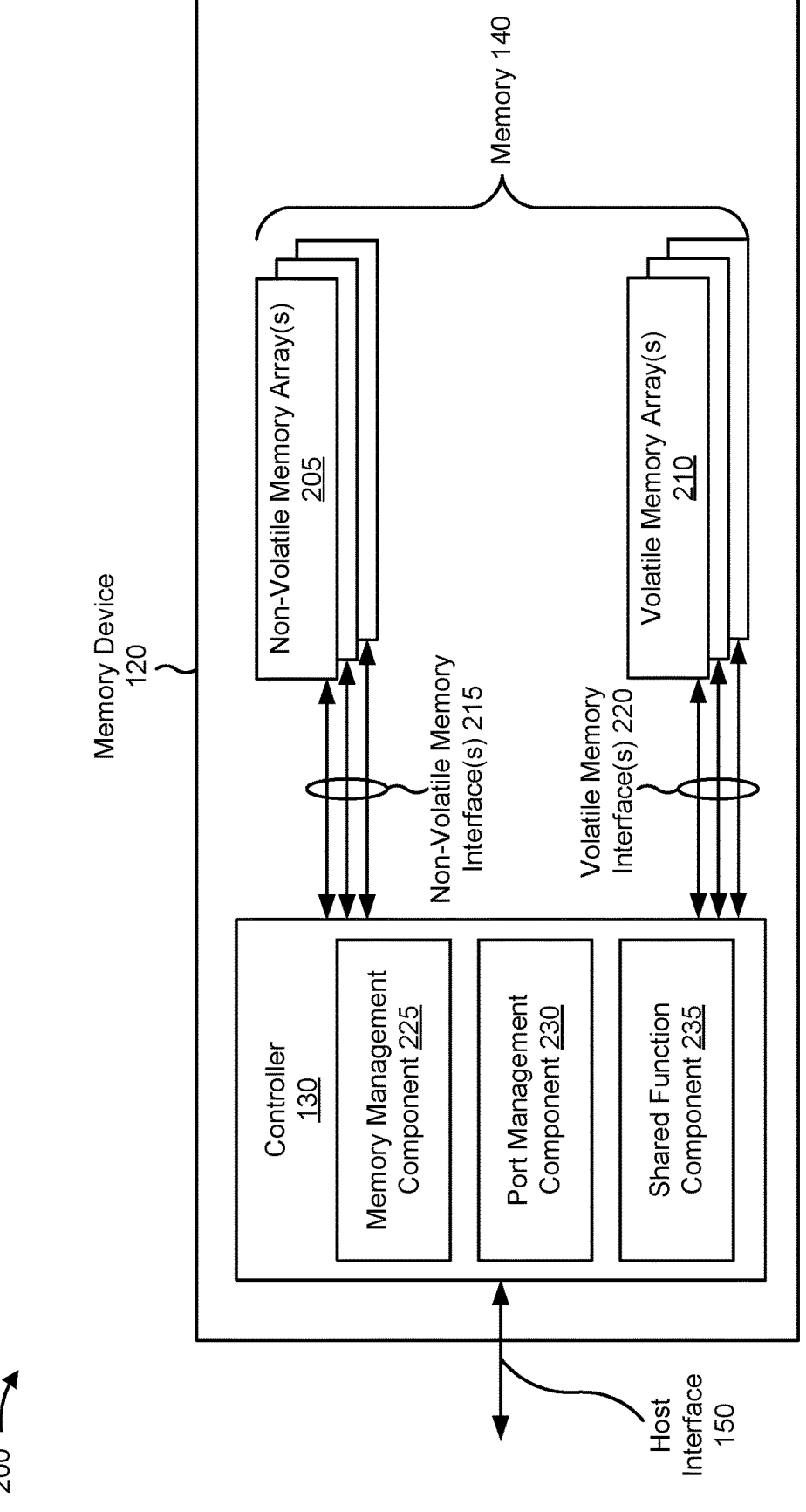
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory

140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a port management component 230, and/or a shared function component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The port management component 230 may be configured to manage one or more ports of the memory device 120. For example, the port management component 230 may be configured to manage a first port of the memory device 120 and to manage a second port of the memory device 120. The memory device 120 may include any number of ports, and the port management component 230 may be configured to manage all ports of the memory device 120 or to manage a subset of the ports of the memory device 120. The port management component 230 may be configured to manage communications between the one or more ports of the memory device and one or more host devices. For example, the port management component 230 may be configured to manage a connection between the first port of the memory device 120 and a first host device 110 and to manage a connection between the second port of the memory device 120 and a second host device 110.

The shared function component 235 may be configured to enable a shared function of the memory device 120. The shared function of the memory device 120 may enable data sharing between one or more ports of the memory device 120. In some implementations, the shared function of the memory device 120 may establish a virtual connection between a first port of the memory device 120 and a second port of the memory device 120 to enable data sharing between the first port and the second port. The shared function of the memory device 120 may enable a first host device that is connected to the first port of the memory device to identify and enumerate the second port of the memory device and/or to communicate with a second host device that is connected to the second port of the memory device. In some implementations, the shared function of the memory device 120 may enable the first host device that is connected to the first port of the memory device to share a resource or a function of the first host device with the second host device that is connected to the second port of the memory device. Additional details are described herein.

One or more devices or components shown in FIG. 2 may be configured to perform operations described herein, such as one or more operations and/or methods described in connection with FIG. 4. For example, the controller 130, the memory management component 225, the port management component 230, and/or the shared function component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
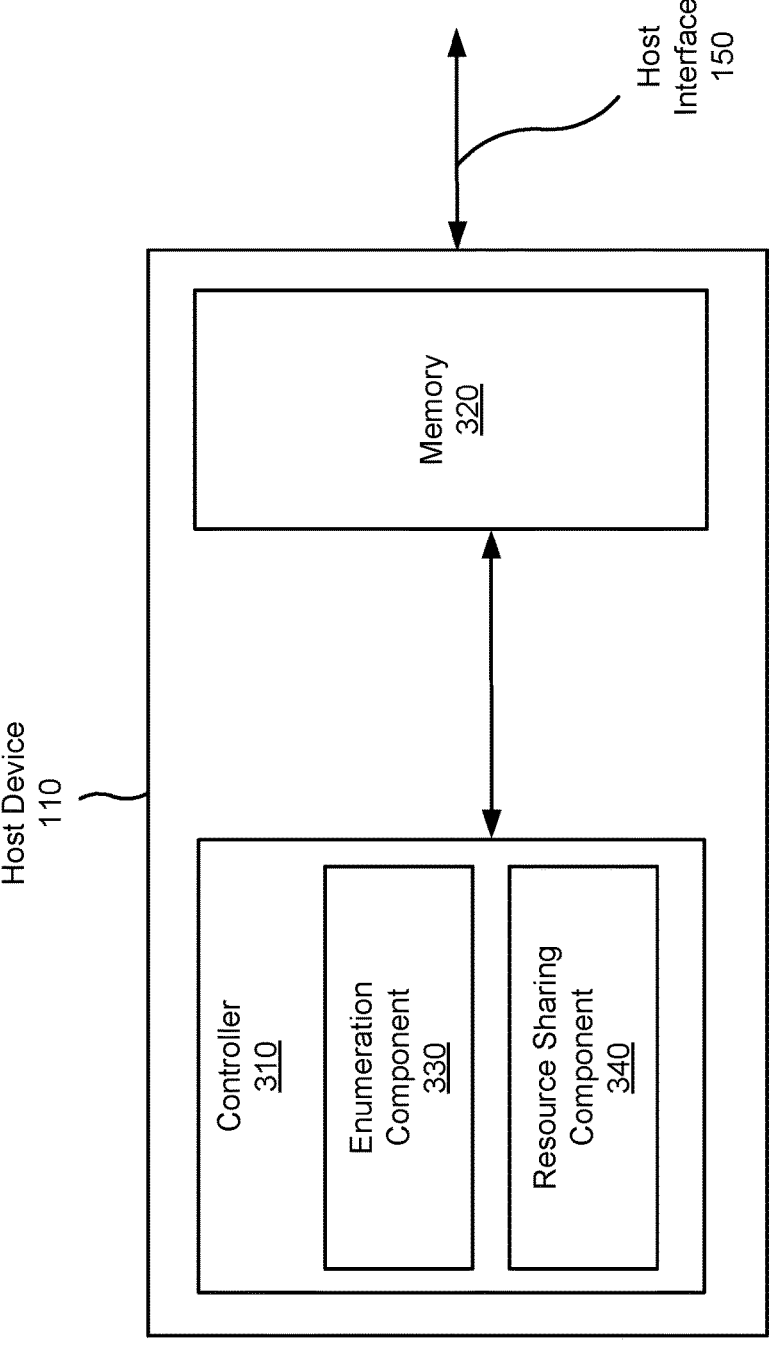
FIG. 3 is a diagram of example components included in a host device.

FIG. 3 is a diagram of example components included in a host device 110. The host device 110 may include a controller 310 and memory 320. The controller 310 associated with the host device 110 may include some or all of the features of the controller 130 associated with the memory device 120. Additionally, or alternatively, the memory 320 associated with the host device 110 may include some or all of the features of the memory 140 associated with the memory device 120.

The controller 310 may control operations of the memory 320, such as by executing one or more instructions. For example, the host device 110 may store one or more instructions in the memory 320, and the controller 310 may execute those one or more instructions. Additionally, or alternatively, the controller 310 may receive one or more instructions from the memory device 120 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 310. The controller 310 may execute the set of instructions to perform one or more operations or methods described herein. In some implementations, execution of the set of instructions, by the controller 310, causes the controller 310 and/or the host device 110 to perform one or more operations or methods described herein. In some implementations, hardwired circuitry is used instead of or in combination with the one or more instructions to perform one or more operations or methods described herein. Additionally, or alternatively, the controller 310 and/or one or more components of the host device 110 may be configured to perform one or more operations or methods described herein.

As shown in FIG. 3, the controller 310 may include an enumeration component 330 and a resource sharing component 340. In some implementations, one or more of these components are implemented as one or more instructions (e.g., firmware) executed by the controller 310. Alternatively, one or more of these components may be implemented as dedicated integrated circuits distinct from controller 310.

The enumeration component 330 may be configured to enumerate one or more ports of the memory device 120. For example, the enumeration component 330 may be configured to detect the memory device 120 and to determine one or more characteristics of the memory device 120, such as a type of memory included in the memory device 120 and a speed at which to communicate with the memory device 120, among other examples. In some implementations, the enumeration component 330 may assign a unique address to one or more ports of the memory device 120. For example, during PCIe enumeration, the host device 110 may identify and connect to the first port of the memory device 120, and the enumeration component 330 may assign a unique address (such as a B:D:F address) to the first port of the memory device 120. The host device 110 and the memory device 120 may communicate data using the unique address that is assigned to the first port by the enumeration component 330.

The resource sharing component 340 may be configured to enable resource sharing between the host device 110 and another host device. As described above, a shared function component 235 of the memory device 120 may enable the host device 110 to identify and enumerate a second port of the memory device 120 to which the host device 110 is not physically connected and/or to identify another host device that is physically connected to the second port of the memory device 120. The resource sharing component 340 may enable the host device 110 (e.g., via the shared function component 235 of the memory device 120) to determine whether the other host device that is connected to the second port of the memory device 120 is in an online state or an offline state, to manage access to the first port of the memory device 120 and the second port of the memory device 120 by the other host device (and/or other devices), to identify one or more physical resources of the first port and the second port and report an availability of the one or more physical resources, and to share resources of the host device 110 with one or more other host devices connected to the one or more other ports of the memory device 120, among other examples. Additional details are described herein.

Figure 4:
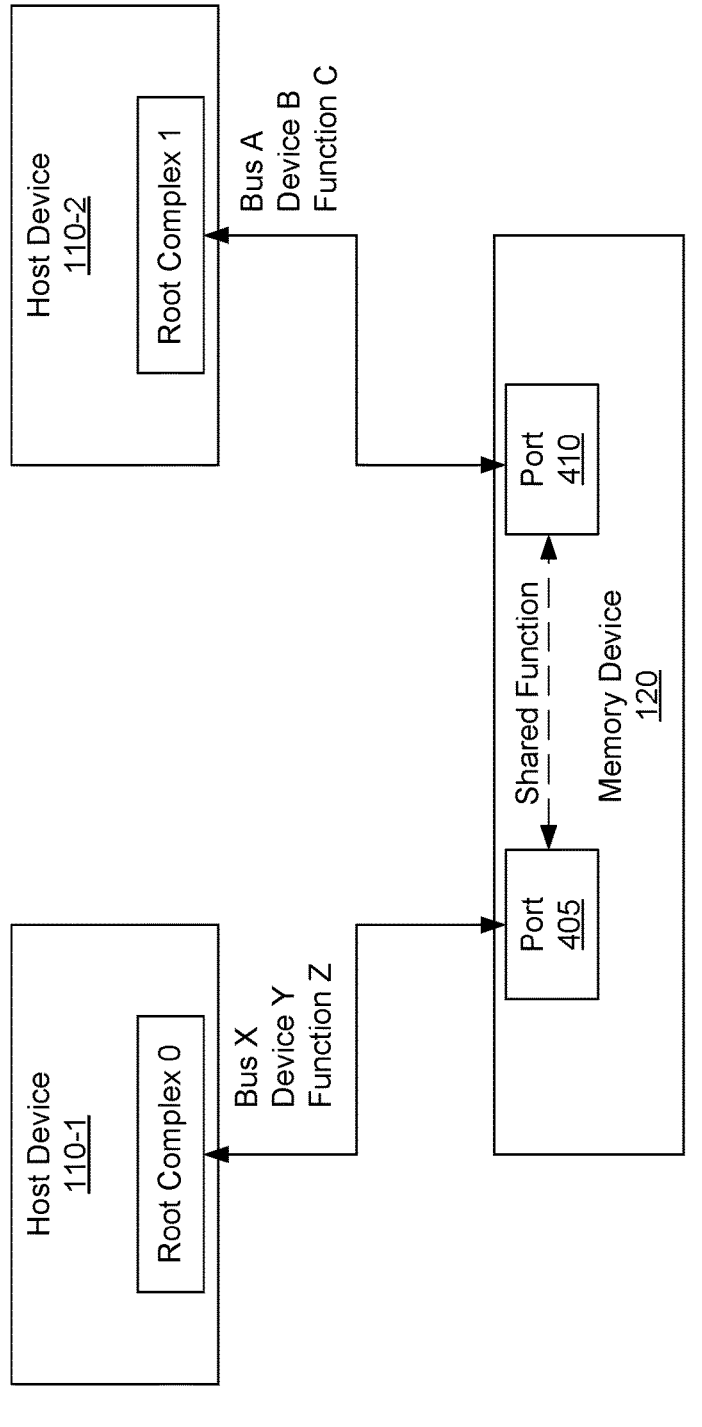
FIG. 4 is a diagram illustrating an example of a shared function for a multi-port memory device.
Figure 6:
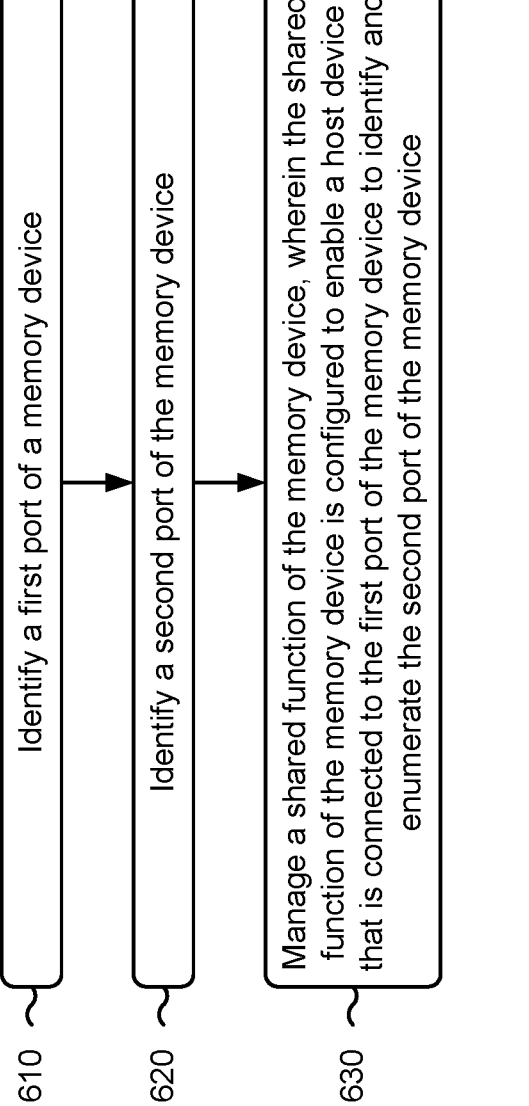
FIG. 6 is a flowchart of an example method associated with a shared function for a multi-port memory device.

One or more devices or components shown in FIG. 3 may be used to carry out operations described elsewhere herein, such as one or more operations of FIG. 4 and/or one or more process blocks of the methods of FIG. 6. For example, the controller 310, the enumeration component and/or the resource sharing component 340 may perform one or more operations and/or methods for the host device 110.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

As indicated above, FIG. 3 is provided as an example. Other examples may differ from what is described with regard to FIG. 3.

FIG. 4 is a diagram illustrating an example 400 of a shared function for a multi-port memory device. A memory device 120 may include a first port, such as port 405, and a second port, such as port 410. While the example 400 shows a memory device 120 that includes two ports, the memory device 120 may include any number of ports. The memory device 120 may include the port management component 230 and/or the shared function component 235 described above.

In some implementations, one or more host devices may connect to one or more ports of the memory device 120. For example, a first host device 110-1 may connect to the first port 405 of the memory device 120 and a second host device 110-2 may connect to the second port 410 of the memory device 120. The first host device 110-1 and the second host device 110-2 may include the enumeration component 330 and/or the resource sharing component 340 described herein. The first host device 110-1 may include a first root complex (Root Complex 0), and the second host device 110-2 may include a second root complex (Root Complex 1). The first root complex may serve as an interface between the first host device 110-1 and the memory device 120, and the second root complex may serve as an interface between the second host device 110-2 and the memory device 120.

During an enumeration process, such as the PCIe enumeration process described herein, all devices connected to a root complex may be enumerated and assigned a unique address. For example, the first host device 110-1 may be assigned a first address that indicates Bus X, Device Y, and Function Z, and the second host device 110-2 may be assigned a second address that indicates Bus A, Device B, and Function C. Without the shared function implemented by the shared function component 235, the first host device 110-1 may not be able identify and enumerate the second port 410 of the memory device 120, and the second host device 110-2 may not be able to identify and enumerate the first port 405 of the memory device 120. This may reduce or prevent resource sharing capabilities between the first host device 110-1 and the second host device 110-2.

The shared function of the memory device 120 may enable a host device to identify and enumerate one or more ports of the memory device 120 to which the host device is not physically connected. For example, the shared function may enable the first host device 110-1 to identify and enumerate the second port 410 of the memory device 120 even though the first host device 110-1 is not physically connected to the second port 410 of the memory device 120. Additionally, or alternatively, the shared function may enable the second host device 110-2 to identify and enumerate the first port 405 of the memory device 120 even though the second host device 110-2 is not physically connected to the first port 405 of the memory device 120.

In some implementations, the shared function of the memory device 120 may establish a virtual connection between the first port 405 of the memory device 120 and the second port 410 of the memory device 120 to enable data sharing between the first port 405 and the second port 410. This may enable the first host device 110-1 to communicate with the second host device 110-2 that is connected to the second port 410 of the memory device 120. For example, the shared function may enable the first host device 110-1 to establish a peer-to-peer (P2P) communication session with the second host device 110-2. Additionally, or alternatively, the shared function may enable the second host device to identify and communicate with the first host device 110-1 that is connected to the first port 405 of the memory device 120. In some implementations, a configuration register associated with the memory device 120 may control one or more cross-port functionalities of the memory device 120. For example, the configuration register may control whether a host device that is connected to a port of the memory device 120 is configured or enabled to establish a P2P communication session with another host device that is connected to another port of the memory device 120.

In some implementations, the shared function may enable the first host device 110-1 and the second host device 110-1 to perform address mapping and identification using one or more identifiers, such as the B:D:F identifier described herein. The shared function may be associated with a configuration space that is similar to configuration spaces of other PCIe functions.

In some implementations, the shared function may be associated with a unique identifier. Each shared function may have its own unique identifier, such as a shared function identifier (SID). The shared function identifier may be reported via the configuration space.

In some implementations, the shared function may include a liveness detection function. The liveness detection function may enable a host device that is connected to a port of the memory device 120 to determine whether another host device that is connected to another port of the memory device 120 is in an on state or an off state. For example, the liveness detection function may enable the first host device 110-1 that is connected to the first port 405 of the memory device 120 to determine whether the second host device 110-2 that is connected to the second port 410 of the memory device 120 is in an on state (such as a powered-on state or an online state) or an off state (such as a powered-off state of an offline state). Additionally, or alternatively, the liveness detection function may enable the second host device 110-2 to determine whether the first host device 110-1 is in the on state or the off state.

In some implementations, the shared function may include a shared function manager capability. The shared function manager capability may enable one or more host devices to act as a manager for one or more ports of the memory device 120 and/or to restrict the shared function across the different ports of the memory device. For example, the first host device 110-1, using the shared function manager capability of the shared function, may be configured to grant or deny the second host device 110-2 access to the first port 405 of the memory device 120 and/or other ports of the memory device 120 to which the second host device 110-2 is not physically connected.

In some implementations, the shared function may enable a resource sharing capability. The resource sharing capability may enable physical resources of two or more ports to be shared by two or more host devices. For example, the resource sharing capability may enable the first host device 110-1 to use physical resources associated with the first port 405 of the memory device 120 and to use physical resources associated with the second port 410 of the memory device 120 using the virtual connection between the first port 405 and the second port 410. Similarly, the resource sharing capability may enable the second host device 110-2 to use physical resources associated with the first port 405 of the memory device 120 and to use physical resources associated with the second port 410 of the memory device 120 using the virtual connection between the first port 405 and the second port 410. An indication of whether the physical resources are available may be sent (e.g., broadcasted) via the configuration space. In one example, the shared function may establish a virtual connection between the first port 405 and the second port 410, which may allow P2P communications between the two ports for directly transferring data between the two ports and/or between two host devices connected to the two ports.

As described herein, the shared function of the memory device may establish a virtual connection between two or more ports of the memory device and may enable resource sharing between the two or more ports of the memory device. For example, the shared function of the memory device may enable a host device to identify and enumerate a port of the memory device to which the host device is not physically connected. Additionally, the shared function of the memory device may enable the host device to detect and communicate with another host device that is physically connected to the port of the memory device. The host device may use the shared function to determine whether one or more other host devices (connected to one or more other ports of the memory device) are in an online state or an offline state, to manage bandwidth that is allocated for each host device to perform read or write operations, and to determine a command queue depth for performing memory device operations, among other examples. While the example shown in FIG. 4 shows a memory device having two ports, and a single host device connected to each port of the memory device, the memory device may be configured with any number of ports, and any number of host devices may be configured to connect to any of the ports of the memory device.

As indicated above, FIG. 4 is provided as an example. Other examples may differ from what is described with regard to FIG. 4.

Figure 5:
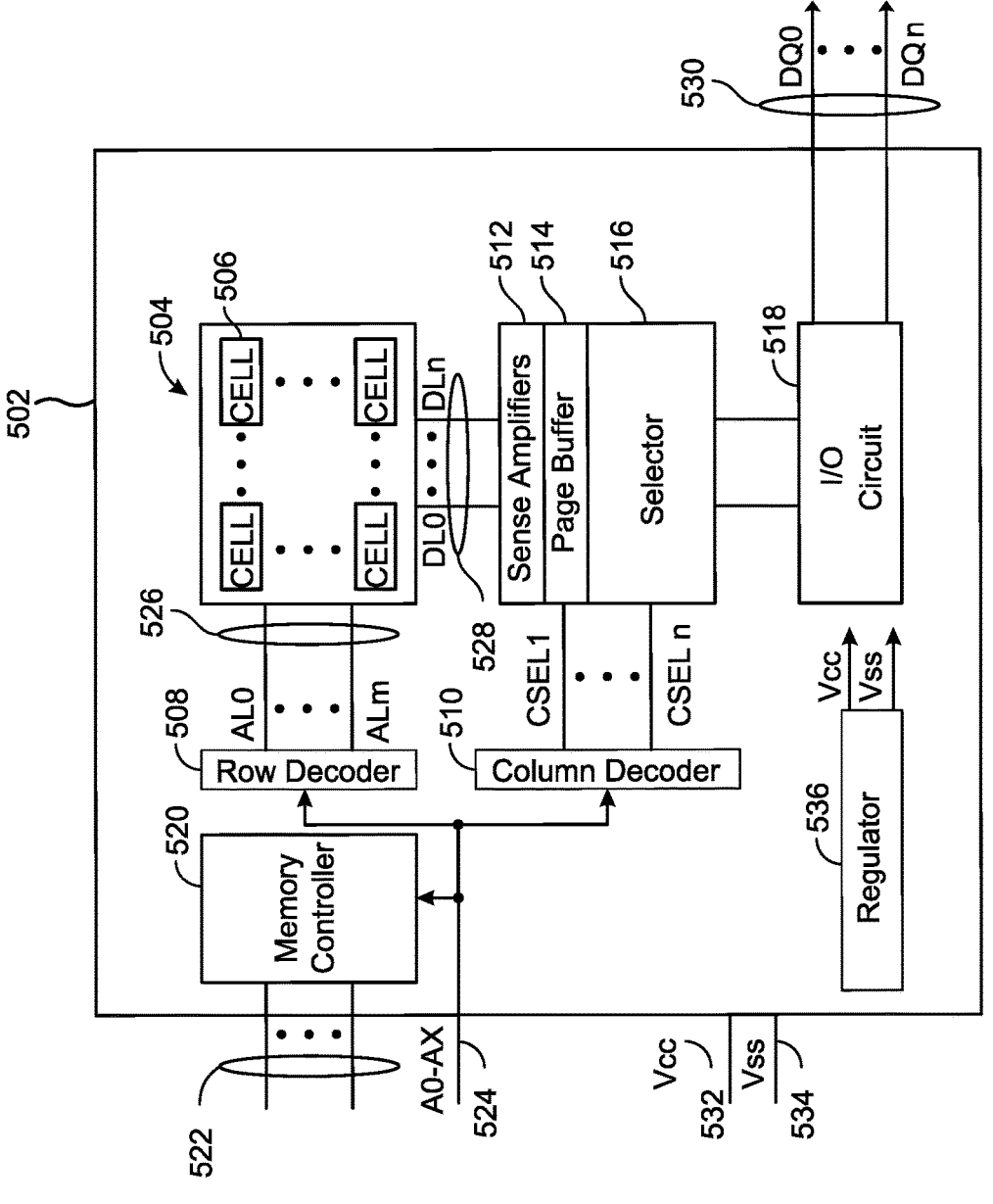
FIG. 5 is a diagram illustrating an example of components included in a memory device.

FIG. 5 is a diagram illustrating an example 500 of components included in a memory device 502. The memory device 502 may be the memory device 120. The memory device 502 may include a memory array 504 having multiple memory cells 506. The memory device 502 may include one or more components (e.g., circuits) to transmit signals to or perform memory operations on the memory array 504. For example, the memory device 502 may include a row decoder 508, a column decoder 510, one or more sense amplifiers 512, a page buffer 514, a selector 516, an input/output (I/O) circuit 518, and a memory controller 520. The memory controller 520 may be the controller 130.

The memory controller 520 may control memory operations of the memory device 502 according to one or more signals received via one or more control lines 522, such as one or more clock signals or control signals that indicate an operation (e.g., write, read, or erase) to be performed. Additionally, or alternatively, the memory controller 520 may determine one or memory cells 506 upon which the operation is to be performed based on one or more signals received via one or more address lines 524, such as one or more address signals (shown as A0-AX). A host device external from the memory device 502 may control the values of the control signals on the control lines 522 and/or the address signals on the address line 524.

The memory device 502 may use access lines 526 (sometimes called word lines or row lines, and shown as AL0-ALm) and data lines 528 (sometimes called digit lines, bit lines, or column lines, and shown as DL0-DLn) to transfer data to or from one or more of the memory cells 506. For example, the row decoder 508 and the column decoder 510 may receive and decode the address signals (A0-AX) from the address line 524 and may determine which of the memory cells 506 are to be accessed based on the address signals. The row decoder 508 and the column decoder 510 may provide signals to those memory cells 506 via one or more access lines 526 and one or more data lines 528, respectively.

For example, the column decoder 510 may receive and decode address signals into one or more column select signals (shown as CSEL1-CSELn). The selector 516 may receive the column select signals and may select data in the page buffer 514 that represents values of data to be read from or to be programmed into memory cells 506. The page buffer 514 may be configured to store data received from a host device before the data is programmed into relevant portions of the memory array 504, or the page buffer 514 may store data read from the memory array 504 before the data is transmitted to the host device. The sense amplifiers 512 may be configured to determine the values to be read from or written to the memory cells 506 using the data lines 528. For example, in a selected string of memory cells 506, a sense amplifier 512 may read a logic level in a memory cell 506 in response to a read current flowing through the selected string to a data line 528. The I/O circuit 518 may transfer values of data into or out of the memory device 502 (e.g., to or from a host device), such as into or out of the page buffer 514 or the memory array 504, using I/O lines 530 (shown as (DQ0-DQn)).

The memory controller 520 may receive positive and negative supply signals, such as a supply voltage (Vcc) 532 and a negative supply (Vss) 534 (e.g., a ground potential), from an external source or power supply (e.g., an internal battery, an external battery, and/or an AC-to-DC converter). In some implementations, the memory controller 520 may include a regulator 536 to internally provide positive or negative supply signals.

One or more devices or components shown in FIG. 5 may be used to carry out operations described elsewhere herein, such as one or more operations of FIG. 4 and/or one or more process blocks of the methods of FIG. 6.

As indicated above, FIG. 5 is provided as an example. Other examples may differ from what is described with regard to FIG. 5.

FIG. 6 is a flowchart of an example method 600 associated with a shared function for a multi-port memory device. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, port management component 230 and/or shared function component 235) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include identifying a first port of a memory device (block 610). As further shown in FIG. 6, the method 600 may include identifying a second port of the memory device (block 620). As further shown in FIG. 6, the method 600 may include managing a shared function of the memory device, wherein the shared function of the memory device is configured to enable a host device that is connected to the first port of the memory device to identify and enumerate the second port of the memory device (block 630).

The method 600 may include additional aspects, such as any single aspect or any combination of aspects described below and/or described in connection with one or more other methods or operations described elsewhere herein.

In a first aspect, the method 600 includes enabling the host device to determine whether another host device that is connected to the second port of the memory device is in an online state or an offline state.

In a second aspect, alone or in combination with the first aspect, the method 600 includes enabling the host device to manage access to the first port and the second port by one or more other host devices.

In a third aspect, alone or in combination with one or more of the first and second aspects, the method 600 includes identifying one or more physical resources of the first port and the second port, and reporting an availability of the one or more physical resources via a configuration space.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a memory device includes a first port; a second port; and one or more components configured to manage a shared function of the memory device, wherein the shared function of the memory device is configured to enable a host device that is connected to the first port of the memory device to identify and enumerate the second port of the memory device.

In some implementations, a system includes a memory device, wherein the memory device comprises: a first port; a second port; and a configuration register that is configured to manage a shared function of the memory device; and a host device, wherein the host device is configured to: connect to the first port of the memory device; and identify and enumerate the second port of the memory device using the shared function of the memory device, wherein the host device is physically connected to the first port of the memory device but is not physically connected to the second port of the memory device.

In some implementations, an apparatus includes means for identifying a first port of a memory device; means for identifying a second port of the memory device; and means for managing a shared function of the memory device, wherein the shared function of the memory device is configured to enable a host device that is connected to the first port of the memory device to identify and enumerate the second port of the memory device.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
a first port;
a second port; and
one or more components configured to manage a shared function of the memory device,
wherein the shared function of the memory device is configured to enable a host device, that is directly connected to the first port, to share data with another host device, that is directly connected to the second port, via a virtual connection between the first port and the second port, wherein a shared function manager is configured to enable the host device to manage access to the first port and the second port by the other host device.

2. The memory device of claim 1,
wherein the shared function enables the host device to identify and enumerate the second port.

3. The memory device of claim 1,
wherein the shared function is configured to enable the host device that is connected to the first port of the memory device to share a resource or a function of the host device with the other host device.

4. The memory device of claim 1,
wherein the host device is associated with a first identifier that includes an indication of the first port, a first bus, the host device, and a first function associated with the host device, and the other host device is associated with a second identifier that includes an indication of the second port, a second bus, the other host device, and a second function associated with the other host device, and wherein the shared function is configured to enable the host device to perform an address mapping and to identify the other host device that is connected to the second port of the memory device using the second identifier.

5. The memory device of claim 1,
wherein the host device is physically connected to the first port but is not physically connected to the second port, and wherein the other host device is physically connected to the second port but is not physically connected to the first port.

6. The memory device of claim 1,
wherein the shared function is associated with a shared function identifier, and wherein the one or more components are configured to report the shared function identifier via a configuration space.

7. The memory device of claim 1,
wherein the shared function comprises a liveness detection function that is configured to enable the host device to determine whether the other host device is in an online state or an offline state.

8. The memory device of claim 1,
wherein the shared function includes a resource sharing function that identifies one or more physical resources of the first port and the second port and reports an availability of the one or more physical resources via a configuration space.

9. A system, comprising:
a memory device, wherein the memory device comprises:
a first port;
a second port; and
a configuration register that is configured to manage a shared function of the memory device; and
a host device, wherein the host device is configured to:
connect directly to the first port of the memory device, and identify whether another host device is in an online state or an offline state; and share data with the other host device, that is directly connected to the second port of the memory device, via a virtual connection between the first port of the memory device and the second port of the memory device.

10. The system of claim 9, wherein the shared function of the memory device is configured to enable the host device to identify and enumerate the second port of the memory device.

11. The system of claim 9, wherein the host device is further configured to:

manage a bandwidth associated with the first port and the second port for performing read operations or write operations; or identify a command queue depth associated with the first port and the second port.

12. The system of claim 9, wherein the shared function is associated with a shared function identifier, and wherein the configuration register is configured to report the shared function identifier via a configuration space.

13. The system of claim 9, wherein the shared function comprises a liveness detection function that is configured to enable the host device to determine whether the other host device is in an online state or an offline state.

14. The system of claim 9, wherein a shared function manager is configured to enable the host device to manage access to the first port and the second port by the other host device.

15. The system of claim 9, wherein the shared function includes a resource sharing function that identifies one or more physical resources of the first port and the second port and reports an availability of the one or more physical resources via a configuration space.

16. The system of claim 9, wherein the host device is associated with a first identifier that includes an indication of the first port, a first bus, the host device, and a first function associated with the host device, and the other host device is associated with a second identifier that includes an indication of the second port, a second bus, the other host device, and a second function associated with the other host device, and wherein the shared function is configured to enable the host device to perform an address mapping and to identify the other host device that is connected to the second port of the memory device using the second identifier.

17. An apparatus, comprising:

means for identifying a first port of a memory device;

means for identifying a second port of the memory device;

means for managing a shared function of the memory device, wherein the shared function of the memory device is configured to enable a host device, that is directly connected to the first port, to share data with another host device, that is directly connected to the second port, via a virtual connection between the first port and the second port; and means for enabling the host device to manage access to the first port and the second port by the other host device.

18. The apparatus of claim 17, further comprising means for enabling the host device to determine whether the other host device is in an online state or an offline state.

19. The apparatus of claim 17, further comprising:

means for identifying one or more physical resources of the first port and the second port; and means for reporting an availability of the one or more physical resources via a configuration space.

20. The apparatus of claim 17, further comprising:

means for enabling the host device to manage access to the first port and the second port by the other host device.

* * * * *